United States Patent
Silberman et al.

(10) Patent No.: US 10,019,573 B2
(45) Date of Patent: *Jul. 10, 2018

(54) SYSTEM AND METHOD FOR DETECTING EXECUTABLE MACHINE INSTRUCTIONS IN A DATA STREAM

(71) Applicant: FireEye, Inc., Milpitas, CA (US)

(72) Inventors: Peter J. Silberman, Kensington, MD (US); James R. Butler, Washington, DC (US); Nick J. Harbour, Alexandria, VA (US)

(73) Assignee: FireEye, Inc., Milpitas, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/263,827

(22) Filed: Apr. 28, 2014

(65) Prior Publication Data

US 2014/0237600 A1 Aug. 21, 2014

Related U.S. Application Data

(63) Continuation of application No. 12/607,055, filed on Oct. 27, 2009, now Pat. No. 8,713,681.

(51) Int. Cl.
G06F 21/56 (2013.01)

(52) U.S. Cl.
CPC ............ *G06F 21/562* (2013.01); *G06F 21/56* (2013.01)

(58) Field of Classification Search
CPC .............................. G06F 21/562; G06F 21/56
See application file for complete search history.

(56) References Cited

U.S. PATENT DOCUMENTS

| 5,752,257 | A | 5/1998 | Ripoll et al. |
| 7,937,387 | B2 | 5/2011 | Frazier et al. |
| 8,069,484 | B2 * | 11/2011 | McMillan et al. ............. 726/23 |
| 8,250,655 | B1 | 8/2012 | Malanov et al. |
| 8,549,624 | B2 * | 10/2013 | Alme ..................... G06F 21/56 713/188 |
| 8,566,476 | B2 | 10/2013 | Shifter et al. |
| 8,713,681 | B2 * | 4/2014 | Silberman et al. ............ 726/24 |

(Continued)

FOREIGN PATENT DOCUMENTS

WO 2008/091785 A2 7/2008

OTHER PUBLICATIONS

Oberheide, Jon, Evan Cooke, and Farnam Jahanian. "Rethinking Antivirus: Executable Analysis in the Network Cloud." HotSec. 2007.*

(Continued)

*Primary Examiner* — Saleh Najjar
*Assistant Examiner* — Louis C Teng
(74) *Attorney, Agent, or Firm* — Rutan & Tucker, LLP

(57) ABSTRACT

Detecting executable machine instructions in a data stream is accomplished by accessing a plurality of values representing data contained within a memory of a computer system and performing pre-processing on the plurality of values to produce a candidate data subset. The pre-processing may include determining whether the plurality of values meets (a) a randomness condition, (b) a length condition, and/or (c) a string ratio condition. The candidate data subset is inspected for computer instructions, characteristics of the computer instructions are determined, and a predetermined action is taken based on the characteristics of the computer instructions.

20 Claims, 3 Drawing Sheets

(56) References Cited

U.S. PATENT DOCUMENTS

| | | |
|---|---|---|
| 8,793,278 B2 | 7/2014 | Frazier et al. |
| 8,881,271 B2 | 11/2014 | Butler, II |
| 8,949,257 B2 | 2/2015 | Shifter et al. |
| 9,106,630 B2 | 8/2015 | Frazier et al. |
| 9,177,144 B2* | 11/2015 | Alme .................... G06F 21/563 |
| 9,268,936 B2 | 2/2016 | Butler |
| 9,275,229 B2 | 3/2016 | LeMasters |
| 9,413,781 B2 | 8/2016 | Cunningham et al. |
| 2003/0200239 A1 | 10/2003 | Hars |
| 2005/0188272 A1* | 8/2005 | Bodorin et al. ................ 714/38 |
| 2006/0026685 A1* | 2/2006 | Saito ............................... 726/23 |
| 2007/0152854 A1* | 7/2007 | Copley ................. G06F 21/562 |
| | | 341/51 |
| 2007/0232909 A1 | 10/2007 | Hughes et al. |
| 2008/0040710 A1* | 2/2008 | Chiriac ......................... 717/136 |
| 2008/0184367 A1* | 7/2008 | McMillan ............. G06F 21/563 |
| | | 726/23 |
| 2008/0201779 A1 | 8/2008 | Tahan et al. |
| 2008/0263659 A1* | 10/2008 | Alme ............................... 726/22 |
| 2009/0013192 A1 | 1/2009 | Chen et al. |
| 2009/0158430 A1 | 6/2009 | Borders |
| 2009/0198651 A1 | 8/2009 | Shifter et al. |
| 2009/0198670 A1 | 8/2009 | Shifter et al. |
| 2009/0198689 A1 | 8/2009 | Frazier et al. |
| 2009/0199274 A1 | 8/2009 | Frazier et al. |
| 2010/0030996 A1 | 2/2010 | Butler, II |
| 2010/0031359 A1* | 2/2010 | Alme .................... G06F 21/56 |
| | | 726/24 |
| 2010/0115620 A1* | 5/2010 | Alme .................... G06F 21/563 |
| | | 726/24 |
| 2010/0242101 A1 | 9/2010 | Reese, Jr. |
| 2010/0281540 A1* | 11/2010 | Alme .................... G06F 21/563 |
| | | 726/23 |
| 2011/0099635 A1* | 4/2011 | Silberman ............ G06F 21/56 |
| | | 726/24 |
| 2011/0173213 A1 | 7/2011 | Frazier et al. |
| 2012/0240231 A1* | 9/2012 | Sohn .................... G06F 21/564 |
| | | 726/24 |
| 2012/0278884 A1* | 11/2012 | Menoher ............... G06F 21/564 |
| | | 726/22 |
| 2013/0247186 A1 | 9/2013 | Lemasters |
| 2013/0318038 A1 | 11/2013 | Shiffer et al. |
| 2013/0318073 A1 | 11/2013 | Shiffer et al. |
| 2013/0325791 A1 | 12/2013 | Shiffer et al. |
| 2013/0325792 A1 | 12/2013 | Shiffer et al. |
| 2013/0325871 A1 | 12/2013 | Shiffer et al. |
| 2013/0325872 A1 | 12/2013 | Shiffer et al. |
| 2014/0032875 A1 | 1/2014 | Butler |
| 2014/0181131 A1 | 6/2014 | Ross |
| 2014/0189687 A1 | 7/2014 | Jung et al. |
| 2014/0189866 A1 | 7/2014 | Shifter et al. |
| 2014/0189882 A1 | 7/2014 | Jung et al. |
| 2014/0237600 A1 | 8/2014 | Silberman et al. |
| 2014/0280245 A1 | 9/2014 | Wilson |
| 2014/0283037 A1 | 9/2014 | Sikorski et al. |
| 2014/0283063 A1 | 9/2014 | Thompson et al. |
| 2014/0289848 A1* | 9/2014 | Lee ..................... G06F 21/566 |
| | | 726/22 |
| 2014/0344926 A1 | 11/2014 | Cunningham et al. |
| 2016/0044000 A1 | 2/2016 | Cunningham |
| 2016/0099967 A1* | 4/2016 | Stemm ................ H04L 63/1483 |
| | | 726/1 |
| 2016/0119366 A1* | 4/2016 | Alme .................... G06F 21/563 |
| | | 726/23 |
| 2016/0205125 A1* | 7/2016 | Kim .................... H04L 63/1416 |
| | | 726/23 |

OTHER PUBLICATIONS

Vigna, Giovanni. "Static disassembly and code analysis." Malware Detection. Springer US, 2007. 19-41.*

Carvey, Harlan. "Malware analysis for windows administrators." Digital Investigation 2.1 (2005): 19-22.*

Likarish et al., Obfuscated malicious javascript detection using classification techniques, Oct. 13-14, 2009, Malicious and Unwanted Software (Malware), 2009 4th International Conference on, pp. 47-54.*

European Search Report for EP Patent Application No. 10827427.5, dated May 26, 2015, four pages.

International Search Report corresponding to PCT/US2010/054262 dated Dec. 22, 2010.

Al Dahoud, et al., "Computer virus strategies and detection methods," Journal of Open Problems Computational Math, vol. 1, No. 2, Sep. 2008, pp. 29-36.

Beaucamps, P., "Advanced polymorphic techniques," World Academy of Science, Engineering & Technology, vol. 34, pp. 253-264, Oct. 31, 2007.

Al Dahoud, et al.; "Computer Virus Strategies and Detection Methods", Journal of Open Problems Computational Math, vol. 1, No. 2, Sep. 2008; pp. 29-36.

Beaucamps, P.; "Advanced Polymorphic Techniques", World Academy of Science, Engineering & Technology. vol. 34, pp. 253-264, Oct. 31, 2007.

Citation establishing publication date for Beaucamps, P., Advanced Polymorphic Techniques, World Academy of Science, Engineering & Technology, vol. 34, pp. 253-264, Oct. 31, 2007.

PCT/US10/54262 filed Oct. 27, 2010, International Search Report and Written Opinion dated Dec. 22, 2010.

U.S. Appl. No. 12/607,055, filed Oct. 27, 2009 Final Office Action dated May 17, 2012.

U.S. Appl. No. 12/607,055, filed Oct. 27, 2009 Non-Final Office Action dated Jan. 4, 2012.

* cited by examiner

SYSTEM AND METHOD FOR DETECTING EXECUTABLE MACHINE INSTRUCTIONS IN A DATA STREAM

CROSS REFERENCE TO RELATED APPLICATION

This patent application claims priority to and is a continuation of U.S. patent application Ser. No. 12/607,055 titled System And Method For Detecting Executable Machine Instructions In A Data Stream and filed Oct. 27, 2009, the entire contents of which is herein incorporated by reference in its entirety.

BACKGROUND OF THE INVENTION

The present invention generally relates to malware detection and more specifically relates to using a determination of data entropy, ratio of string data to non-string data, and computer instruction disassembly to detect malware inside of data files that should not contain executable code.

A common problem facing information security personnel is the need to identify suspicious or outright malicious software or data on a computer system. This problem typically arises when an attacker uses a malicious piece of software to compromise a computer system. Initial steps taken in response to this kind of situation include attempts to locate and identify malicious software (also known as "malware", comprised of machine instructions) or data, followed by attempts to classify that malicious software so that its capabilities may better be understood. Investigators and response personnel use a variety of techniques to locate and identify suspicious software, such as temporal analysis, filtering of known entities, and Live Response.

Temporal analysis involves a review of all activity on a system according to date and time so that events occurring on or around a time window of suspected compromise may be more closely examined. Such items might include event log entries; files created, deleted, accessed, or modified; processes that were started or terminated; network ports opened or closed, and similar items.

Additionally a comparison of files on the system being examined against known file patterns may be performed. In this situation, all files on the system may be reviewed and compared against a database of known, previously encountered files. Such comparisons are usually accomplished through use of a cryptographic hash algorithm—a well known mathematical function that takes the data from a file and turns it into a compact numerical representation known as a hash value. A fundamental property of hash functions is that if two hash values generated using the same algorithm are different, then the data used to generate those hashes must also be different. The corollary is that hashes found to match were generated from data that was identical. While the corollary is not always true, hash collisions (identical hashes generated from different input data) for cryptographic hash algorithms are rare such that a hash comparison may be used to determine file equivalence.

An alternative to reviewing static historical data such as files and event logs is Live Response. This technique examines running programs, system memory contents, network port activity, and other system metadata while the computer system is still on and in a compromised state in order to identify how it may have been modified by an attacker.

There are many other techniques that may be employed to identify suspicious activity on a potentially compromised computer system. These techniques often generate a rather large amount of data, all of which must be reviewed and interpreted in order to reach any conclusions. Further complicating this technique is the fact that attackers typically have a good understanding of the techniques used to identify compromised systems. They employ various methods to hide their presence, making the job of an investigator that much more difficult. Some of these techniques include deleting indicators of their entry to a system once it's compromised, such as log file entries, file modification/access dates, and system processes. Attackers may also obfuscate running malware by changing its name or execution profile such that it appears to be something benign. In order to better hide malware or other data stored on disk, attackers may make use of a "packed" storage format. Packing is a technique by which data is obfuscated or encrypted and encapsulated along with a program to perform a decryption/de-obfuscation, and then stored somewhere on a system. For example, a "Packed Executable" is a piece of software that contains an "unpacking" program and a payload of encrypted data. That payload is often malicious software, such as a virus or Trojan Horse. Attackers may also embed malware inside of files that otherwise would not contain executable machine instructions. This packaging serves two purposes—it attempts to hide the attacker's malware in a location that may be easily overlooked by an investigator. It also may be used to dupe a computer user into inadvertently executing the malware, thus compromising their computer system.

One of the fundamental properties of a data set consisting of machine instructions, when compared to human readable data set, is that the randomness, or "entropy" of the data tends to be higher. Techniques for determining data entropy to identify malware are described in U.S. patent application Ser. No. 11/657,541, published as US Pat. Pub.2008-0184367, the disclosure of which is hereby incorporated by reference in its entirety into the present application. While an examination of entropy may provide a useful filter, a measure of entropy alone is not a guaranteed method for identifying executable machine instructions. Moreover, there are drawbacks to using entropy across a block of data. For example, entropy is a global measurement across a data set, returning a single value across that set. This means that a data block may return a low entropy measurement when in fact small sections of that same data may contain very high entropy. This scenario may be true even if the majority of the data block has low entropy.

Thus, there is a need in the art for a technique to derive a robust measurement of entropy in order to detect the presence of malware in a computer system that has been hidden by an attacker inside of data streams that do not normally contain executable machine instructions.

SUMMARY

The present inventors have developed techniques that derive a robust measurement of entropy combined with analysis of string-based data in order to detect the presence of executable machine instructions in a data stream.

In addition to entropy, string ratios may be examined to identify whether a block of data is more likely to be executable machine instructions. A string is a sequence of characters that may be represented, for example, in either the American Standard Code for Information Interchange (ASCII) or Unicode—both of which are industry standard methods for representing human readable information in a computer system. The presence of a large number of strings, or the presence of a large contiguous string in a data block, are indicators that a block of data is less likely to be machine readable instructions and more likely to be human readable text.

Blocks of information may also be "brute force" disassembled—that is, a given block of information may be assumed to contain a set of machine instructions and attempts may be made to interpret that data as instructions to identify if they are valid. A data block may contain instructions in combination with other data. The challenge in this circumstance is identifying what subset of information within the block are machine instructions versus other types of information. To overcome this, disassembly may be attempted at each offset within the data block and the results examined to identify ratios of valid versus invalid instruction sequences.

Thus, a block of data may be analyzed by measuring the ratio of string to non-string information in a data block and identifying the presence of long, contiguous strings, in addition to applying entropy measurements. A resulting filter may effectively identify the presence of potential machine instructions in an arbitrary data stream. Combination of such filters with a "brute force" disassembly method results in a reliable system for identifying machine instructions in a data stream.

In an embodiment, analyzing whether executable code exists within data may include accessing a plurality of values representing data contained within a memory of a computer system and performing pre-processing on the plurality of values to produce a candidate data subset. The pre-processing may be performed by a computer and consist of determining whether the plurality of values meets at least one of (a) a randomness condition, (b) a length condition, and (c) a string ratio condition. Analyzing whether executable code exists within data may further include: inspecting, with the computer, the candidate data subset for computer instructions and determining one or more characteristics of the computer instructions. A predetermined action based on the characteristics of the computer instructions may be taken.

In a further embodiment, accessing a plurality of values may further include retrieving data directly from at least one memory component contained within the computer system.

In another embodiment, accessing a plurality of values may further include reading an input stream from a persistent storage device. Reading the input stream may include reading a file from a hard drive of a computer system.

In yet a further embodiment, determining whether the plurality of values meets the randomness condition may include performing an entropy calculation, and the entropy calculation may include computation of a value for Shannon entropy.

In an embodiment, the length condition may include a minimum threshold value. The threshold value may be smaller than the candidate data subset.

In another embodiment, inspecting the candidate data set may include a brute force disassembly of the candidate data subset. The brute force disassembly may include determining if any PPMJXC instruction sequences exist in the candidate data set, determining if any other instruction sequences exist in the candidate data subset, and/or determining if an instruction sequence exists in the plurality of values that indicates an end of the instruction sequence.

In a further embodiment, taking a predetermined action may include providing notification to a user and/or executing an automated process.

In an embodiment, a tangible computer readable media has instructions which enable a machine to access a plurality of values representing data contained within a memory of a computer system and perform pre-processing on the plurality of values to produce a candidate data subset. The pre-processing may be performed by a computer and consist of determining whether the plurality of values meets at least one of (a) a randomness condition, (b) a length condition, and (c) a string ratio condition. The instructions may further enable the machine to inspect, with the computer, the candidate data subset for computer instructions and determine one or more characteristics of the computer instructions, and take a predetermined action based on the characteristics of the computer instructions.

In a yet further embodiment, a distributed method of analyzing whether executable code exists within data may include accessing, at a first location, a plurality of values representing data contained within a memory of a computer system and performing pre-processing on the plurality of values to produce a candidate data subset. The pre-processing may be performed by a first computer and consist of determining whether the plurality of values meets at least one of (a) a randomness condition, (b) a length condition, and (c) a string ratio condition. The candidate data subset may be transmitted to a second location. Analyzing whether executable code exists within data may further include: inspecting, at the second location, with a second computer, the candidate data subset for computer instructions and determining one or more characteristics of the computer instructions. A predetermined action based on the characteristics of the computer instructions may be taken.

In an embodiment, the first computer may be a computer of a user; the second computer may be a remote service, which may be a cloud computing based remote service.

Other systems, methods, features, and advantages consistent with the present invention will become apparent to one with skill in the art upon examination of the following figures and detailed description. It is intended that such additional systems, methods, features, and advantages be included within this description and be within the scope of the invention.

BRIEF DESCRIPTION OF THE DRAWINGS

The accompanying drawings, which are incorporated in and constitute a part of this specification, illustrate an implementation of methods and systems consistent with the present invention and, together with the description, serve to explain advantages and principles consistent with the invention. In the drawings.

DETAILED DESCRIPTION

Figure 1:
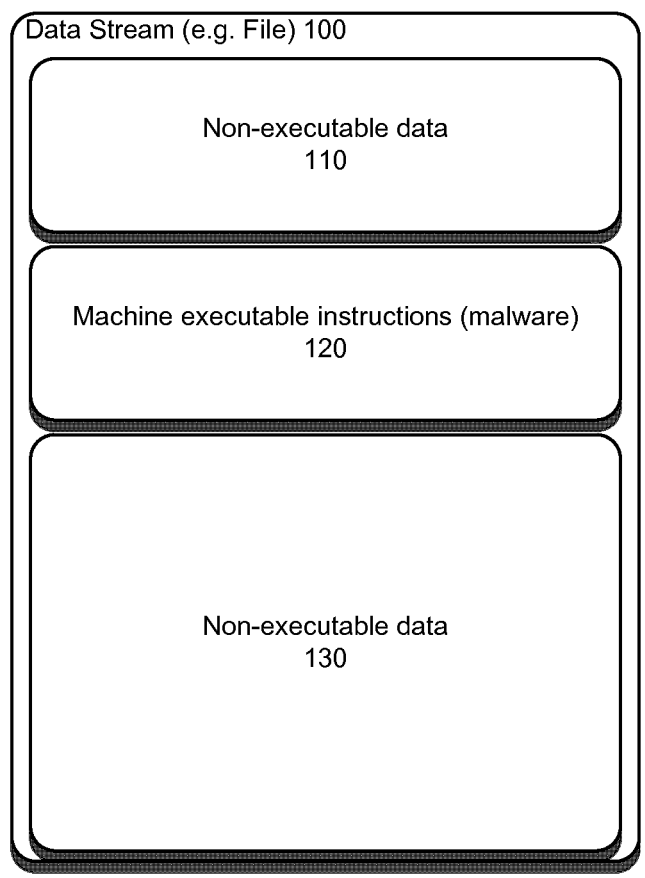
FIG. 1 illustrates how executable machine instructions may be embedded in a data stream that contains non-machine instruction (or "non-executable") data.

The presently disclosed techniques provide for analysis of arbitrary blocks of data from a computer system. The analysis may include quantification of the data's entropic characteristics so as to reach conclusions about how suspicious or interesting the data may be. The terms "suspicious" and "interesting", as used herein, refer to data that might be an indication of a compromised computer system, or related directly to a compromising technique. Identifying executable code inside of an arbitrary data stream may also be interesting in circumstances other than computer security incidents. For example, the presence of executable code in data may be of interest in the intelligence, law enforcement, or policy compliance fields.

An entropy determination method may consist of a specific combination of techniques that may divide a segment of data from a computer system into pieces and apply mathematical techniques for determining entropy across those pieces. Subsequently, each segment data may be subjected to additional analysis, or not, depending on whether it meets a specified entropy threshold. For example, a data stream may be divided into pieces, where each piece is 256 bytes in size, before being analyzed for entropy.

If a data block meets a specified entropy threshold, it may be analyzed for the presence of string information in a number of ways. For example, the largest contiguous string may be identified. In addition, or alternatively, the overall ratio of string to non-string information for that block may be calculated. If the longest contiguous string is below a specified threshold and the ratio of string to non-string data is also below a specified threshold, "brute force" disassembly may be attempted.

Brute force disassembly may be used to interpret the data segment as machine instructions at each offset within the data segment. For example, if a data segment is 256 bytes long, the disassembly would involve attempting to interpret the data segment as machine instructions multiple times— once starting at byte 0 and reading through byte 255, once starting at byte 1 and reading through byte 255, and so on. During each pass the number of each different type of machine instruction encountered is recorded. A specified heuristic may be applied to determine the "most valid" disassembly from the data segment. In one embodiment consistent with the invention, a heuristic called PPMJXC may be used. PPMJXC stands for Push Pop Mov Jmp Xor Call. These are machine instructions that occur with very high frequency in software. When analyzing a data segment to determine if it is executable code, a higher ratio of PPMJXC instructions when compared to other instruction types within a data segment may be indicative of such executable code. When using PPMJXC, the data segment with the highest number of these commands may be selected as the "most valid" disassembly. In cases where there are two disassemblies of a data segment with the same number of PPMJXC instructions, the disassembly with the lower offset is utilized to obtain the largest number of machine instructions. The disassembly may be conducted in such a way that the results must contain a minimum number of PPMJXC instructions, for example, twenty, in order to be considered valid.

Once disassembly has been completed, additional validation operations may be applied across the disassembly to further validate or refine the findings. For example, several additional checks may be applied to the disassembled information: i) the valid instructions in the disassembly need to belong to a set of well known, understood instructions (e.g. "valid instructions for the computer processor of the system being examined"); and ii) the disassembly needs to end with a valid instruction that signifies the end of a machine instruction block—such blocks contain instructions that return flow of control to some other region of a computer system's memory. A disassembly meeting all of the above criteria may be positively identified as executable code embedded in a data stream. Both the data segment and the overall data stream the data segment was a member of may be marked in some fashion for review through a user interface.

A malware detection method in a data processing system may determine suspicious data based on identifying executable machine instructions in data streams such as files or memory. The method, for example, may include acquiring a segment of data, calculating an entropy value for the segment of data, comparing the entropy value to a threshold value, identifying string ratio and length characteristics, performing a brute force disassembly, and validating that disassembly. The data segment and parent data stream may be marked as interesting or suspicious if a valid disassembly for machine instructions is identified. The method may further include reporting suspicious data to an administrator.

Reference will now be made in detail to an implementation consistent with the present invention as illustrated in the accompanying drawings.

FIG. 1 illustrates how executable machine instructions may be embedded in a data stream that contains non-machine instruction data. A data stream 100 (in this example, a file stored on a computer system) may contain non-machine instruction (or "non-executable") data segments 110 and 130, for example.

The computer system in the present example may include any computer system capable of executing the methods of the described embodiments and may include one or more processors and one or more memories. The computer system may also include a network of two or more computers, including computers accessible over the Internet and via cloud computing-based services. The computer memory may be capable of storing instructions executable by a processor and such instructions may be stored in temporary memory or persistent memory. Such persistent memory may include a hard drive. The computer system may be enabled to execute any of the processes described with reference to FIG. 2 and FIG. 3.

Embedded within the data stream in the computer system, in-between non-executable data segments 110 and 130, for example, an executable segment of machine instructions, 120, may exist. Embedding segment 120 may accomplish a variety of purposes, including but not limited to, disguising malware in order to evade detection or enhancing the probability of compromising a computer system as the result of a computer system user opening the data stream and inadvertently executing the machine instructions contained in the data stream.

Figure 2:
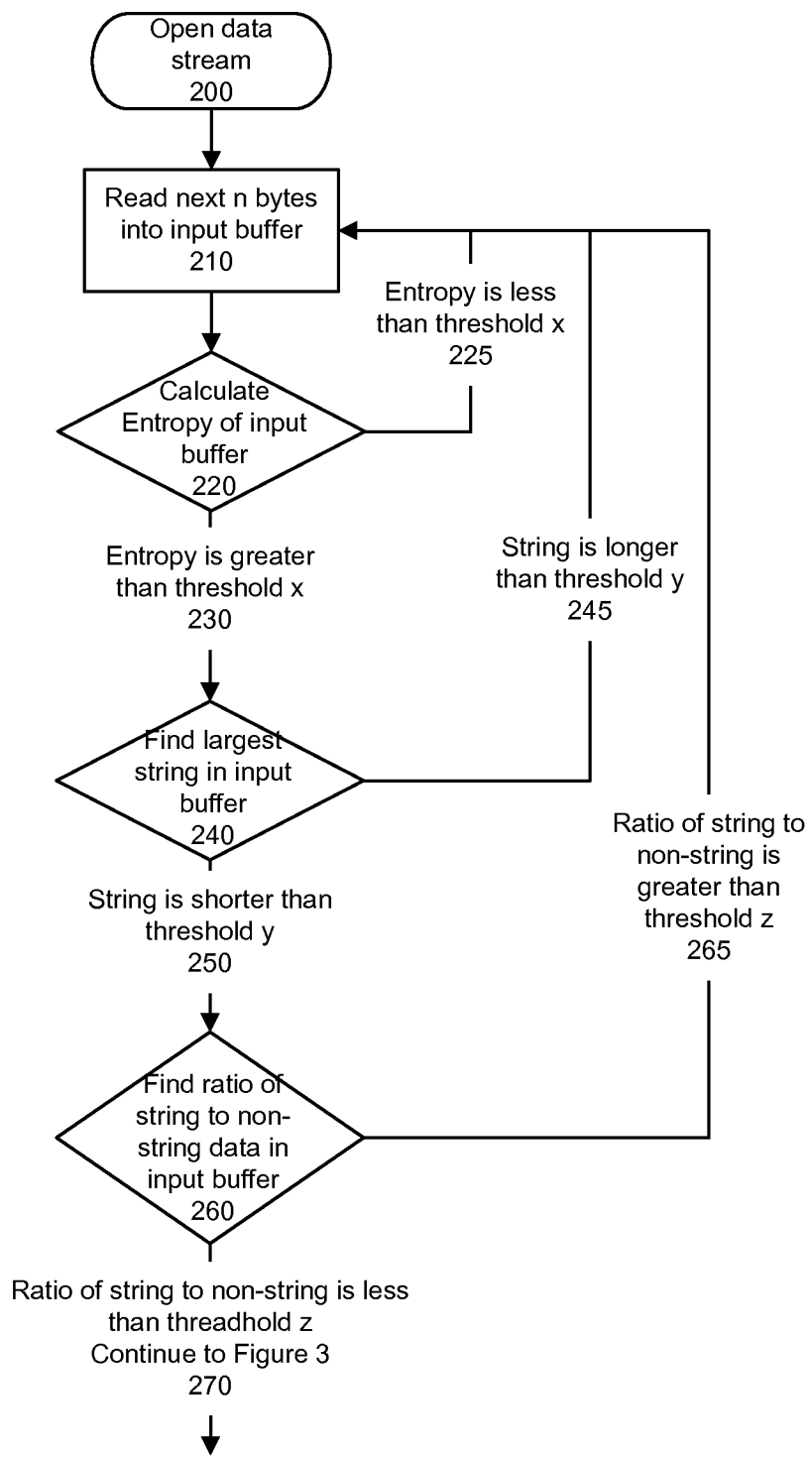
FIG. 2 illustrates a detailed flowchart of a method of detecting malware by finding executable code in an arbitrary data stream using an entropy calculation and string analysis consistent with the present invention.

FIG. 2 illustrates a detailed flowchart of a method of detecting malware by finding executable code in an arbitrary data stream using an entropy calculation and string analysis consistent with the present invention. At step 200 a data stream may be opened for reading. At step 210, n bytes may be read into an input buffer. In one embodiment consistent with the invention, n is 256.

At step 220 an entropy calculation is made across the input buffer. There are several mathematical methods for generating a numeric understanding of the entropy, or "randomness", of a block of data or signal. A description of one example for calculating entropy is now provided. In one embodiment consistent with the present invention, an entropy determination method uses a calculation first described by Claude Shannon that is now commonly referred to as Shannon Entropy, as follows:

$$H(X) = \sum_{i=1}^{n} p(x_i) \log_2 \left( \frac{1}{p(x_i)} \right)$$

where p(x) is the probability of x given the discrete random variable X. Since X is discrete, an alphabet is chosen. Since the data is binary digital data organized in bytes (or 8-bit blocks), the alphabet should be the set {0 . . . 255}, or in binary, '00000000' through '11111111'. This will require a minimum block of scanned data to be 256 bytes in length. While this is not a requirement, the value H(X) will be different depending on the alphabet used. The value is normalized such that

PH(X)ϵ0.0 . . . 1.0 where

PH(X)=H(X)/MAX(H(X))

In short, the entropy value calculated through application of this method is a number between 0 and 1, where values closer to 1 indicate higher degrees of entropy in a given block of data. For a more thorough discussion of Shannon Entropy, see Shannon, C. E. "A Mathematical Theory of Communication." *The Bell System Technical J.* 27, 379-423 and 623-656, July and Oct. 1948, which is incorporated by reference.

If the entropy calculated at step 220 is determined at a step 225 to be less than a threshold x, the input buffer contents may be discarded and the next set of n bytes may be read into the input buffer from the data stream (step 210). This process may be repeated until the entropy calculated at step 220 is greater than a specified randomness condition, such as a threshold x (step 230). If an input buffer has entropy greater than x, it then may be reviewed for the presence of string data (represented as either ASCII or Unicode) in step 240. The longest string from the input buffer may be identified. If it is longer than threshold y (step 245), i.e., a first length condition, the input buffer may be discarded and the next set of bytes may be read from the input stream (step 210). The entropy and string length process may be then repeated until an input buffer is found with entropy greater than x (step 230) and a "longest string" of length less than y (step 250), i.e. a second length condition. In an embodiment, x may be equal to 3.5 for certain entropy algorithms other than the Shannon algorithm and y may be equal to 100 bytes. Thus, to meet the randomness condition where x is 3.5, the input buffer must have an entropy of at least 3.6, i.e., a minimum threshold value, or no more than 3.4, i.e., a maximum threshold value. Likewise, to meet the first length condition where y is 100 bytes, the string must be at least 101 bytes, i.e., a minimum threshold value, and to meet the second length condition, the string must be no more than 99 bytes, i.e., a maximum threshold value. At step 260 the ratio of string to non-string data may be calculated for the input buffer. If it is greater than threshold z (step 265) the input buffer may be discarded and the next set of bytes may be read from the data stream (step 210). In an embodiment, z may be equal to 60%. The entropy measurement (step 220), string length identification (step 240), and string ratio (step 260) processes comprise the pre-processing that may be performed on the data values in the input buffer to perform a candidate data set. Those pre-processing steps may be repeated until an input buffer is found that has entropy greater than x, maximum string length less than y, and a string to non-string ratio of less than z. in an embodiment, when an input buffer is identified that meets all three criteria, the process moves on to the next phase with that candidate data set (step 270).

Figure 3:
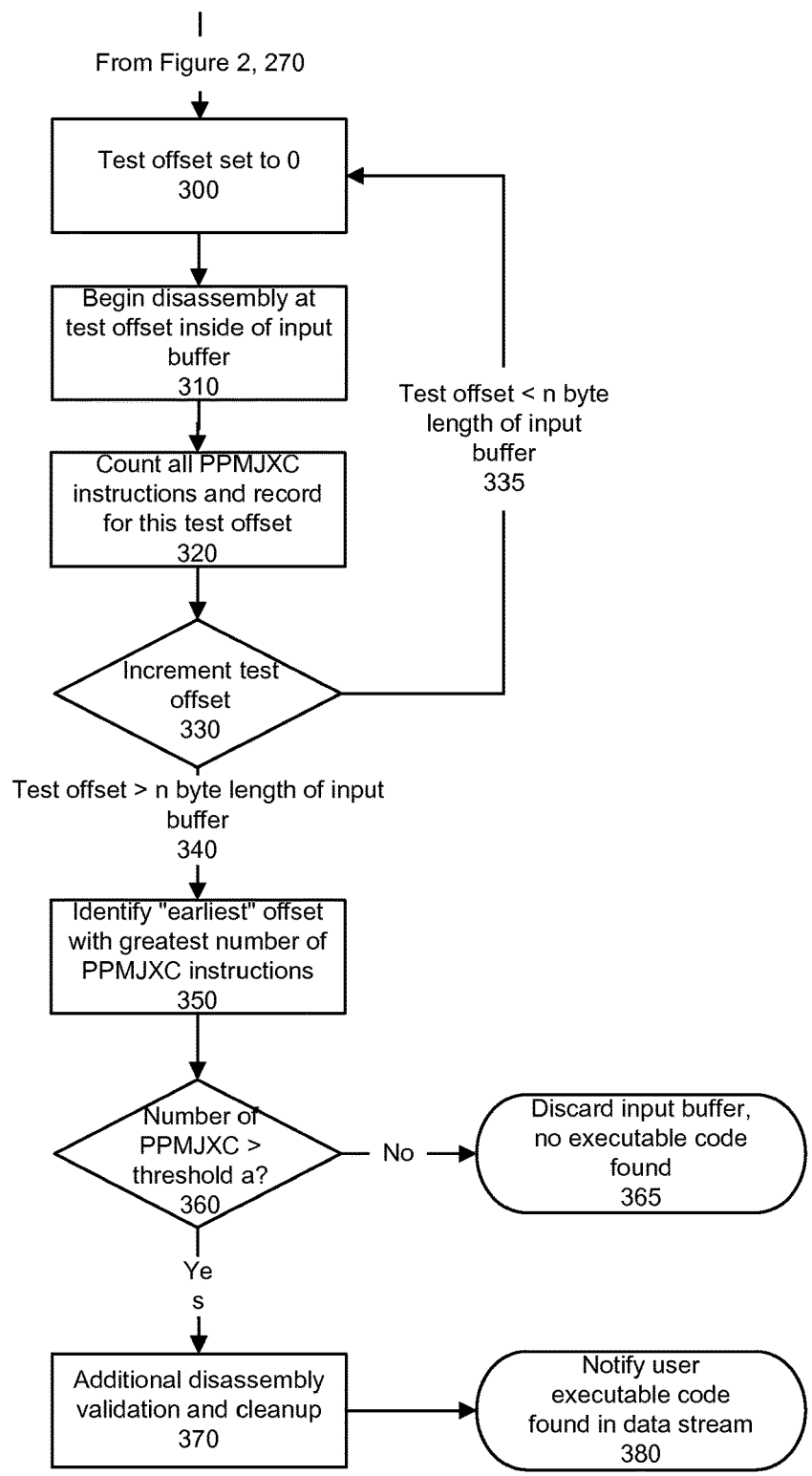
FIG. 3 continues the flowchart started in FIG. 2 and completes the description of a method of detecting malware by finding executable code in an arbitrary data stream through use of brute force disassembly, and disassembly validation consistent with the present invention.

FIG. 3 continues the flowchart started in FIG. 2 and completes the description of a method of detecting malware by finding executable code in an arbitrary data stream through use of brute force disassembly, and disassembly validation consistent with the present invention. Once a candidate data set is found to meet the criteria identified in FIG. 2, a series of "brute force" disassemblies may be attempted on the candidate data set in the input buffer to identify the presence of machine executable instructions. In step 300, a test offset value may be set to 0, which measures how far into the input buffer (in bytes) to begin a disassembly. In step 310, disassembly begins in the input buffer at the test offset. In step 320, all Push, Pop, Mov, Jmp, Xor, and Call (PPMJXC) instructions may be counted during the disassembly and recorded for that test offset. The test offset may be then incremented by one (step 330). If the test offset is less than the total number of bytes in the input buffer (step 335), the process may be then repeated starting at the new test offset. If the test offset is greater than the number of bytes in the input buffer (step 340), all possible disassemblies have been attempted for the input buffer. At step 350 the test offset/PPMJXC count information may be reviewed and the earliest offset with the greatest number of PPMJXC instructions may be selected as the "most valid" disassembly run. In step 360, the number of PPMJXC instructions may be compared to a threshold a; if it does not exceed that threshold, the input buffer may be discarded and the entire analysis process begins again (step 210 from FIG. 2). In an embodiment, a may be equal to 20 instructions. If the count of PPMJXC instructions does exceed threshold a, additional validation and disassembly "cleanup" procedures may be attempted across the input buffer to further refine the identification of executable code (step 370). In one embodiment consistent with the invention, two additional validations may be performed: i) all instructions beyond PPMJXC in the input buffer may be verified as valid, and ii) the end of the executable machine instructions in the input buffer may be examined to ensure that the last instructions at the end of an executable instruction sequence are consistent with the computer architecture the executable code is targeted for. Different computer processors may have different instruction sets, including different instructions for indicating the end of an executable block of code. In one embodiment consistent with the invention, an instruction for returning flow control on Intel-branded "x86" computer processors is identified. Once the optional validation steps are complete (step 370), the user may be notified that the data stream and input buffer contain executable machine instructions (step 380).

One of ordinary skill in the art will recognize that any number of metadata analyses may be exploited in order to increase the accuracy and type of determinations that may be made when coupled with an identification of machine executable instructions. The example explained above describes the function of the invention when looking at files stored on a system in order to identify data files containing machine executable instructions. The same approach may be applied against different elements of a file on disk, portions of system or process memory, or any other stream of data where the presence of machine executable instructions may be an indication of an anomaly or other state that a user wishes to detect. Furthermore, various operations may be performed in an embodiment in different locations. For example, the preprocessing may be performed at a local computer, while the determination of executable code may be performed at a remote location.

While there has been illustrated and described embodiments consistent with the present invention, it will be understood by those skilled in the art that various changes and modifications may be made and equivalents may be substituted for elements thereof without departing from the true scope of the invention. Therefore, it is intended that this invention not be limited to any particular embodiment disclosed, but that the invention will include all embodiments falling within the scope of the appended claims.

We claim:

1. A method of analyzing whether executable code exists within data that signifies a presence of malware, the method comprising:
 accessing a plurality of values representing the data contained within a memory of a first computer system by (a) retrieving the data directly from at least one memory component contained within the first computer system, or (b) reading the data corresponding to an input stream from a persistent storage device;
 performing pre-processing on the plurality of values to produce a candidate data subset, the performing of the pre-processing includes (i) determining whether an entropy of the plurality of values exceeds a first threshold and (ii) conducting an analysis of the plurality of values for a presence of string data by determining whether (a) a selected string of the string data satisfies a string length condition and (b) data associated with the plurality of values satisfies a string ratio condition; and
 responsive to performing the pre-processing on the plurality of values, analyzing the candidate data subset to determine if any executable code is present in the plurality of values, wherein the analyzing of the candidate data subset comprises a disassembly of the candidate data subset including a first pass of scanning the candidate data subset at an offset and performing additional passes by incrementing the offset and scanning a remaining portion of the candidate data subset from the incremented offset, wherein the scanning includes recording a number of different types of machine instructions detected such that a detected ratio of Push, Pop, Mov, Jmp, Xor or Call (PPMJXC) instructions to non-PPMJXC instructions greater than or equal to a predefined threshold is indicative of a presence of executable code.

2. The method of claim 1, wherein the reading of the data corresponding to the input stream comprises reading a file from a hard drive of the first computer system.

3. The method of claim 1, wherein the determining whether the entropy of the plurality of values exceeds the first threshold comprises (a) determining whether the plurality of values meets a randomness condition, and (b) performing an entropy calculation.

4. The method of claim 3, wherein the entropy calculation comprises computation of a value for Shannon entropy.

5. The method of claim 1, wherein the string length condition is determined by evaluating whether the selected string is less than a maximum number of bytes, and the string ratio condition is determined by a ratio between string data associated with the plurality of values to non-string data associated with the plurality of values.

6. The method of claim 5, wherein the string length condition includes (a) a first minimum threshold value, and (b) a first maximum threshold value.

7. The method of claim 6, wherein, if the selected string meets the string length condition, the plurality of values are processed to determine whether the plurality of values meets the string ratio condition.

8. The method of claim 7, wherein the string ratio condition includes (a) a second minimum threshold value, and (b) a second maximum threshold value.

9. The method of claim 1, further comprising:
 determining if an instruction sequence exists in the plurality of values that indicates an end of an executable block of code.

10. The method of claim 1, wherein the analyzing of the candidate data subset to determine if any executable code is present in the plurality of values comprises
 inspecting, via a second computer system, the candidate data subset for computer instructions,
 determining one or more characteristics of the computer instructions, and
 taking at least one of a plurality of predetermined actions based on the characteristics of the computer instructions.

11. The method of claim 10, wherein the plurality of predetermined actions includes (a) executing an automated process, and (b) providing a notification to a user.

12. The method of claim 1, wherein the analysis of the plurality of values for the presence of string data is conducted in response to the entropy of the plurality of values exceeding the first threshold.

13. The method of claim 12, wherein the analysis of the plurality of values for the presence of string data to determine whether the data associated with the plurality of values satisfy the string ratio condition comprises determining whether a ratio of string data to non-string data exceeds a threshold.

14. A non-transitory computer readable medium wherein the computer readable medium includes instructions which enable a computer system to perform the following operations:
 access a plurality of values representing data contained within a memory of a computer system by (a) retrieving data directly from the memory of the computer system, or (b) reading an input stream of the computer system;
 perform pre-processing on the plurality of values to produce a candidate data subset, the performing of the pre-processing includes (i) determining whether an entropy of the plurality of values exceeds a first threshold and (ii) conducting an analysis of the plurality of values for a presence of string data by determining whether (a) a selected string of the string data satisfies a string length condition, and (b) data associated with the plurality of values satisfies a string ratio condition;
 analyze, via the computer system, the candidate data subset to determine if any executable code is present in the plurality of values, wherein analyzing the candidate data subset comprises a disassembly of the candidate data subset including a first pass of scanning the candidate data subset at an offset and performing additional passes by incrementing the offset and scanning a remaining portion of the candidate data subset from the incremented offset, wherein the scanning includes recording a number of different types of machine instructions detected such that a detected ratio of Push, Pop, Mov, Jmp, Xor or Call (PPMJXC) instructions to non-PPMJXC instructions greater than or equal to a predefined threshold is indicative of a presence of executable code; and take at least one of a plurality of predetermined actions based on determining the detected ratio of PPMJXC instructions to non-PPMJXC instructions is indicative of the presence of executable code.

15. The computer readable medium of claim 14, wherein the determining whether the entropy of the plurality of values exceeds the first threshold comprises (a) determining whether the plurality of values meets a randomness condition, and (b) performing an entropy calculation.

16. The computer readable medium of claim 14, wherein the string length condition includes (a) a first minimum threshold value, and (b) a first maximum threshold value.

17. A distributed method of analyzing whether executable code exists within data comprising:
   at a first location:
      accessing a plurality of values representing data contained within a memory of a first computer system by (a) retrieving data directly from the memory of the first computer system, or (b) reading an input stream of the first computer system,
      performing pre-processing on the plurality of values to produce a candidate data subset, the performing of the pre-processing includes (i) determining whether an entropy of the plurality of values exceeds a first threshold and (ii) conducting an analysis of the plurality of values for a presence of string data by determining whether (a) a selected string of the string data satisfies a string length condition, and (b) data associated with the plurality of values satisfies a string ratio condition, and
      transmitting the candidate data subset to a second location; and
   at the second location:
      analyzing, via a second computer system, the candidate data subset to determine if any executable code is present in the plurality of values, wherein analyzing the candidate data subset comprises a disassembly of the candidate data subset including a first pass of scanning the candidate data subset at an offset and performing additional passes by incrementing the offset and scanning a remaining portion of the candidate data subset from the incremented offset, wherein the scanning includes recording a number of different types of machine instructions detected such that a detected ratio of Push, Pop, Mov, Jmp, Xor or Call (PPMJXC) instructions to non-PPMJXC instructions greater than or equal to a predefined threshold is indicative of a presence of executable code, and
      taking at least one of a plurality of predetermined actions based on determining the detected ratio of PPMJXC instructions to non-PPMJXC instructions is indicative of the presence of executable code.

18. The method of claim 17, wherein the first computer system is a computer of a user.

19. The method of claim 18, wherein the second computer system comprises a remote service.

20. The method of claim 19, wherein the remote service comprises a cloud computing based service.

\* \* \* \* \*